(12) United States Patent
Leach et al.

(10) Patent No.: US 7,643,670 B2
(45) Date of Patent: Jan. 5, 2010

(54) METHOD AND APPARATUS OF PROCESSING A TIME-SEQUENCE OF SEPARATE IMAGE DATA SETS

(75) Inventors: Martin O Leach, Wallington (GB); Michael Khazen, Sutton (GB)

(73) Assignees: The Institute of Cancer Research, London (GB); The Royal Marsden NHS Trust, Surrey (GB)

(*) Notice: Subject to any disclaimer, the term of this patent is extended or adjusted under 35 U.S.C. 154(b) by 395 days.

(21) Appl. No.: 10/567,540

(22) PCT Filed: Aug. 6, 2004

(86) PCT No.: PCT/GB2004/003421

§ 371 (c)(1),
(2), (4) Date: Oct. 23, 2006

(87) PCT Pub. No.: WO2005/015502

PCT Pub. Date: Feb. 17, 2005

(65) Prior Publication Data

US 2007/0127809 A1 Jun. 7, 2007

(30) Foreign Application Priority Data

Aug. 8, 2003 (GB) .................................. 0318701.0

(51) Int. Cl.
*G06T 15/00* (2006.01)
*G06K 9/00* (2006.01)
*G06K 9/18* (2006.01)
*G06K 9/32* (2006.01)
(52) U.S. Cl. ........................ 382/154; 382/128; 382/284; 382/294; 345/419
(58) Field of Classification Search ......... 382/128–132, 382/154, 274; 128/922; 345/419–427
See application file for complete search history.

(56) References Cited

U.S. PATENT DOCUMENTS 6,363,163 B1 * 3/2002 Xu et al. ..................... 382/130

(Continued)

FOREIGN PATENT DOCUMENTS

EP 1310913 5/2003

(Continued)

OTHER PUBLICATIONS

Meijering et al, "Image Registration for Digital Subtraction Angiography", International Journal of Computer Vision 31(2/3), 227-246 (1999).*

(Continued)

*Primary Examiner*—Yubin Hung
*Assistant Examiner*—Andrae S Allison
(74) *Attorney, Agent, or Firm*—Niels Haun; Dann Dorfman Herrell & Skillman, PC

(57) ABSTRACT

There is disclosed a method apparatus for image processing of e.g. MRI images. A method and apparatus is disclosed enabling one to determine if an image contrast/intensity change of a chosen point within an imaged subject volume (e.g. a lesion) is an artefact of motion in the imaged subject. An apparatus and method for fast visual assessment of the imaged subject volume's alignment quality (within a time-sequence of images) is provided, and an interactive display tool enabling effective use of this method is provided.

25 Claims, 6 Drawing Sheets

U.S. PATENT DOCUMENTS

| | | | |
|---|---|---|---|
| 7,187,810 B2* | 3/2007 | Clune et al. | 382/294 |
| 7,406,215 B2* | 7/2008 | Clune et al. | 382/294 |
| 7,421,061 B2* | 9/2008 | Boese et al. | 378/98.12 |
| 2002/0070970 A1 | 6/2002 | Wood et al. | |
| 2005/0226527 A1* | 10/2005 | Weese et al. | 382/275 |

FOREIGN PATENT DOCUMENTS

| | | |
|---|---|---|
| WO | WO 01/54067 | 7/2001 |

OTHER PUBLICATIONS

Y. Bentoutou, N. Taleb, M. Chikr El Mezouar, M. Taleb, L. Jetto, An invariant approach for image registration in digital subtraction angiography, Pattern Recognition vol. 35, Issue 12, , Dec. 2002, pp. 2853-2865.*

Erik H. W. Meijering et al., "Reduction of Patient Motion Artifacts in Digital Subtraction Angiography: Evaluation of a Fast and Fully Automatic Technique", Radiology, Apr. 2001, pp. 288-293, vol. 219, No. 1.*

Meijering et al, A Fast Technique for Motion Correction in DSA Using a Feature-Based, Irregular Grid, Image Sciences Institute, Utrecht University, Heidelberglaan 100, 3584 CX Utrecht, The Netherlands, MICCAI'98, LNCS 1496, pp. 590{597, 1998.*

Freeman, M.L., et al., "Time-Domain Analysis in Gated Cardiac Blood Pool Studies", International Journal of Nuclear Medicine & Biology, 1982, vol. 9, pp. 37-41.

Nuss, MC., et al., "Time Domain Images", Optics Letters, Apr. 1, 1995, vol. 20, pp. 740-742.

International Search Report Under Section 17 dated Jun. 15, 2004.

Edholm, Paul R., et al. "Linograms in Image Reconstruction from Projections," IEEE Transactions on Medical Imaging, vol. MI-6, No. 4, Dec. 1987, pp. 301-307.

International Search Report Dated Sep. 27, 2004.

* cited by examiner (a)

(b)

METHOD AND APPARATUS OF PROCESSING A TIME-SEQUENCE OF SEPARATE IMAGE DATA SETS

The present invention relates to methods and apparatus for image processing and, particularly, though not exclusively, to the processing of Nuclear Magnetic Resonance image data.

Certain imaging technologies, such as Magnetic Resonance (MR) imaging, permit the subject of the imaging process to be fully imaged in three spatial dimensions. They permit the acquisition of image data which is able to represent a 3D "view" of the subject from any aspect or perspective in 3D space. This is in contrast to image data acquired through a series of predetermined "projections" which only enable "views" limited to one of the predetermined projections employed in acquiring the image data.

Dynamic imaging, such as dynamic MR imaging, may involve the acquisition of a time-series of image data sets in which each data set is able to represent an image of the subject fully in 3D at one of a series of successive instants (or brief periods) in time. Dynamic imaging is often used to record the internal changes in properties of a stationary subject which are induced by a controlled change-inducing influence. An example of this is contrast-enhanced medical MR imaging in which a "contrast agent" is introduced into a stationary subject (e.g. a person) which is detectable as an increase in the image contrast/brightness of those internal parts of the subject in which the agent is located.

An analysis of the change in image properties (e.g. in image contrast/brightness), over time, of chosen fixed points or static regions within the imaged volume of the subject enables an assessment of the properties of the chosen fixed points/regions within that imaged volume. However, this assessment is rendered void if the chosen fixed points/regions of the imaged subject are assumed to be fixed/static but were, in fact, not static during the time-sequence in question. The result would be that changes in the properties of chosen points/regions would not be due to changes in the properties of the same point/region of the subject, but would instead be due to the chosen point/region not representing the same point/region of the image subject for the duration of the time-sequence. Thus, image changes would be due to changes in the position of the subject (i.e. subject motion) rather than to changes in the subject per se.

For example, the image analysis procedure in breast dynamic imaging typically involves localisation of a lesion within an image of the subject containing a contrast agent. Image analysis may involve analysis of the shape of "time-intensity" curves representing the temporal development of pixel intensity of chosen points/regions of the subject image and may involve pharmacokinetic modelling. All the techniques assume that the imaged volumes within the time-series are properly spatially aligned. A dynamic breast scan is a time consuming examination. The overall examination time can be up to 30 minutes. During such a long time a patient can move because of discomfort or tension. The motion most likely damages the spatial alignment of the imaged subject volumes within the time-sequence, and may lead to unreliable results, such as appearance of false lesions within the subtracted post-contrast image. Also, no reliable analysis based on the time-intensity uptake curves is possible if the curves are not representative of the same point/region of the imaged subject. The motion of breast is not always easy to detect. Due to the high degree of elasticity of a breast tissue, a local motion may occur resulting in local deformation of some region the breast and tiny deformation of the remaining part of the volume. It follows that it is important to be able to assess a quality of alignment of image data, in the local region of interest, as between imaged volumes within a time-sequence.

The present invention aims to overcome at least some of the above deficiencies of the prior art.

The present invention proposes to provide a method and/or apparatus enabling one to determine if a contrast/intensity change of a chosen point within an imaged subject volume (e.g. a lesion) is a motion artefact. An apparatus and method for fast visual assessment of the imaged subject volume's alignment quality (within the time-sequence) is provided, and interactive display tool enabling effective use of this method is provided.

In a first of its aspects, the present invention may provide a method of processing a time-sequence of separate image data sets each set comprising a plurality of image data items which each represent the location of an image pixel of the image subject according to a spatially fixed reference frame within which the subject is located, the method including the steps of:

(a) selecting a plurality of separate image pixel locations within the reference frame;
(b) selecting from each of a plurality of the separate image data sets those image data items which represent image pixels located at the plurality of separate image pixel locations;
(c) generating a time-domain image according to the selected image data items wherein those image pixels of the time-domain image sharing a common image pixel location within the reference frame are arranged in time-sequence in a line containing only those pixels.

Thus, the reference frame within which the subject is located is common to all image data items of all image data sets of the time-sequence. By lining-up image pixels sharing the same spatial coordinates within the reference frame, one lines-up the temporally successive pixel representations of the same point of space (imaged at successive times within a time-sequence) within the reference frame in which the subject is located. In doing so, one does not necessarily line-up image pixels of the same points of the imaged subject since the subject (or a part of it) may have moved its location within the reference frame during time-sequence. However, should such subject movement occur, a consequence is often a visibly discontinuous change, or an irregularity, in a property of image pixels (e.g. brightness, or colour) as between neighbouring pixels of the line of pixels in the time-domain image. The location of such a discontinuity/irregularity within the time-domain image identifies two image volumes within the time-sequence between which the subject motion occurred. This method may be applied to image data sets with image data items representing pixel locations extending only in 2D (e.g. image "slices"), as well as those extending in all three spatial dimensions (i.e. image volumes).

Preferably, each image pixel is an image voxel such that each image data item represents the location of an image voxel of the image subject according to a spatially fixed three-dimensional reference frame, preferably, each image data set contains image data items representing image voxel locations spanning all three dimensions of the reference frame.

By selecting the image data items representing a plurality of separate image pixel locations within the reference frame, a time-domain image comprising a plurality of separate lines each containing only those pixels sharing a common image pixel location may be provided. The plurality of such separate lines are preferably arranged side-by-side such that those image pixels of neighbouring lines which share a common image data set are also aligned so as to form a line. This arrangement assists in visually assessing image data for the presence of motion artefacts since such artefacts are most likely to affect a plurality of image pixel locations within the reference frame rather than just one such location. Accordingly, local image features may well display motion artefacts as a collective discontinuity or irregularity shared by several or each of the side-by-side lines within the time-domain image.

The time-domain image is preferably generated such that those image pixels of the time-domain image which are represented by image data items selected from a common image data set are arranged in a line containing only those pixels.

Often small regions within the imaged subject volume suffer motion artefacts while the remaining volume does not. In order to facilitate easy visual identification of such localised motion, the plurality of separate image pixel locations selected from within the reference frame at step (a) are neighbouring such locations. Consequently, provided that localised motion affects a small region of spatial dimensions matching or exceeding the spatial separation between such neighbouring image pixel locations, then motion artefacts will appear in the time-domain image (generated at step (c)) as a collective discontinuity/irregularity affecting the same regions of neighbouring of the side-by-side lines therein. Such collective discontinuity not only indicates the extent of subject motion but is also easier to spot within a time-domain image.

The time-domain image preferably comprises a matrix of pixels arranged to define columns and rows, wherein each column (or, alternatively, each row) contains only those image pixels sharing a common pixel location within the reference frame, and each row (or, alternatively, each column) contains only those image pixels selected from a common image data set.

Preferably, the time-domain image is generated such that each separate line of image pixels of a common image pixel location contains successive line segments containing only those pixels which share a common image data set. Thus, each such line segment is comprised only of several copies of the same image pixel. Each segment within a line may contain the same number of image pixels (copies) thereby rendering each line segment the same length. Motion artefacts in a single image pixel location result in a visible shift of an entire line segment. This is much easier to identify than is a shift in a single pixel. More preferably, each of the side-by-side lines of the time-domain image comprises successive such line segments, and preferably corresponding line segments of each such side-by-side line are equal in length (i.e. the same number of image pixels therein).

Preferably, the selection of the plurality of image pixel locations at step (a) comprises selecting a target image pixel location within the reference frame and subsequently selecting all image pixel locations which are intersected by a predefined first locus intersecting the target image pixel location. The locus may be any predefined shape and may be defined by a mathematical expression in terms of the coordinates of the reference frame, or may simply be a preselected trail of successive image pixel locations extending through the reference frame.

Preferably, the predefined first locus is a line extending through the reference frame. The line preferably extends through only one dimension of the reference frame and intersects all pixel locations within a column or a row of pixel locations within the reference frame. In this way a linear cross-sectional view (in one dimension, i.e. 1D) through the imaged subject volume is provided.

For example, method may include: selecting a target one of the plurality of separate image data sets and selecting therefrom those image data items which represent image pixels located in a common first plane containing the first locus; and generating a first spatial-domain image according to the data items so selected. The method preferably also includes generating a composite image containing the first spatial-domain image and the time-domain image aligned such that those pixels of the first spatial-domain image and of the time-domain image which share a common image pixel location within the reference frame are arranged in-line.

Such in-line arrangement enables a view of a spatial cross-section of the imaged subject volume and a simultaneous view of a time-domain image of the subject, each view sharing at least one common spatial dimension defined by the first locus. The time-domain image also extends in the time dimension while the first spatial-domain image extends in two spatial dimensions. In-line arrangement of the two images enables a direct visual comparison of the image features present along the common spatial dimension shared by the two images.

Preferably the first locus is simultaneously visually presented within the composite image as a first locus image overlaying one or each of the spatial-domain and the time-domain images and intersecting those image pixels of the respective images which represent pixel locations within the reference frame intersected by the first locus. Alternatively, such image pixels may be highlighted or otherwise rendered distinct from their neighbouring image pixels within the composite image.

Preferably, the selection of the plurality of image pixel locations at step (a) comprises selecting the target image pixel location within the reference frame and subsequently selecting all image pixel locations which are intersected by a predefined second locus intersecting the first locus at the target image pixel location. The second locus may be any predefined shape and may be defined by a mathematical expression in terms of the coordinates of the reference frame, or may simply be a preselected trail of successive image pixel locations extending through the reference frame.

Consequently, the composite image may contain a second time-domain image generated according to any one of the method steps discussed above in respect of the second predefined locus which intersects the first locus. The second locus is preferably substantially coplanar with the first locus. The first spatial-domain image and the second time-domain image are preferably aligned such that those pixels of the first spatial-domain image and of the second time-domain image which share a common image pixel location within the reference frame are arranged in-line.

Preferably, a second locus image of the form of the first locus image may simultaneously be presented in either or each of the spatial-domain image and the second time-domain image.

The first predefined locus is preferably a line and the second predefined locus is preferably also a line substantially perpendicular to the first predefined locus. This provides a cross-hair effect in a locus image comprising the first and second locus images. The cross-hairs will centre upon the target pixel location within the spatial-domain image.

For example, when the first and second locus' are perpendicular and coplanar the composite image, comprising the first spatial-domain image and both the first and second time-domain images, provides a composite image representing three dimensions in which each time-domain image shares a separate one of the two spatial dimensions of the first spatial-domain image, and in which each time-domain image extends in the time dimension. Graphically, the time dimension of each time-domain image may extend perpendicularly to the spatial dimension of the image in question. A further spatial dimension orthogonal to those represented in the first spatial-domain image may also be represented within the composite image thereby rendering the latter representative of four dimensions (i.e. three spatial and one temporal).

Thus, preferably, the selection of the plurality of image pixel locations at step (a) comprises selecting the target image pixel location within the reference frame and subsequently selecting all image pixel locations which are intersected by a predefined third locus intersecting the first locus and the second locus at the target image pixel location. The third locus may be any predefined shape and may be defined by a mathematical expression in terms of the coordinates of the reference frame, or may simply be a preselected trail of successive image pixel locations extending through the reference frame.

Consequently, the composite image may contain a third time-domain image generated according to any one of the method steps discussed above in respect of the third predefined locus which intersects the first and second locus'. The third locus is preferably non-coplanar (e.g. perpendicular) with the first locus and the second locus.

The method may further include: selecting from the target one of the plurality of separate image data sets those data items which represent image pixels located in a common second plane being non-parallel and non-coplanar with the first plane and containing the first locus; generating a second spatial domain image according to the data items so selected. The method preferably further includes generating the composite image so as to contain the second spatial-domain image aligned such that those pixels of the second spatial-domain image and of the time-domain image which share a common pixel location within the reference frame are arranged in-line.

In this way, a third spatial domain is represented within the composite image by the presence of the second spatial-domain image which also shares one common spatial dimension with both the first spatial-domain image and the first time-domain image. This common spatial dimension is defined by the first locus and preferably the common spatial axis of each of the first time-domain, first spatial-domain and second spatial-domain images are aligned in parallel and side-by-side such that the time axis of the first time-domain image and the spatial axes of the first and second spatial-domain images which are perpendicular to the first locus, are all aligned sequentially in-line and in parallel. This permits rapid visual assessment of image data in three spatial and one temporal dimension.

The method may also include: selecting from the target one of the plurality of separate image data sets those data items which represent image pixels located in a common third plane being non-parallel and non-coplanar with the first plane (and the second plane, preferably) and containing the second locus; and generating a third spatial domain image according to the data items so selected. Preferably the method further includes generating the composite image so as to contain the third spatial-domain image aligned such that those pixels of the third spatial-domain image and of the second time-domain image which share a common pixel location within the reference frame are arranged in-line. Again, most preferably the parallel alignment of common spatial axes is provided in a side-by-side arrangement as discussed above.

The first, second and third planes are preferably all mutually substantially perpendicular. Preferably, the second plane and the third plane, in respect of which the second and third spatial-domain images are generated, each contain the third locus.

The third time-domain image and either the third or the second spatial-domain image are preferably aligned such that those pixels of the third time-domain image and of either the second or the third spatial-domain image which share a common image pixel location within the reference frame are arranged in-line. The spatial axis of the third time-domain image may be arranged parallel and in-line with the spatial axis of the first time-domain image (i.e. the two images side-by-side) when the third time-domain image is aligned with the third spatial-domain image. Alternatively, the spatial axis of the third time-domain image may be arranged parallel and in-line with the spatial axis of the second time-domain image (i.e. the two images side-by-side) when the third time-domain image is aligned with the second spatial-domain image. Preferably, a third locus image of the form of the first or second locus image may simultaneously be presented in either or each of the second or third spatial-domain image and the third time-domain image.

Preferably, all image pixels within each of the images contained within the composite image which are intersected by a locus are highlighted so as to render them distinguishable from their neighbouring image pixels, or are overlaid by a locus image which represents the position of a locus within an image.

Planes are non-parallel if the normal extending from one plane is not parallel to the normal extending from another "non-parallel" plane.

In a second of its aspects the present invention may provide apparatus for processing a time-sequence of separate image data sets each set comprising a plurality of image data items which each represent the location of an image pixel of the image subject according to a spatially fixed reference frame within which the subject is located, the method including the steps of:

(a) first selection means selecting a plurality of separate image pixel locations within the reference frame;

(b) second selection means for selecting from each of a plurality of the separate image data sets those image data items which represent image pixels located at the plurality of separate image pixel locations;

(c) image generating means for generating a time-domain image according to the selected image data items wherein those image pixels of the time-domain image sharing a common image pixel location within the reference frame are arranged in the time-sequence in a line containing only those pixels.

Each image pixel is preferably an image voxel such that each image data item represent the location of an image voxel of the image subject according to a spatially fixed three-dimensional reference frame. Preferably each image data set contains image data items representing image voxel locations spanning all three dimensions of the reference frame.

The first selection means is preferably arranged to select a target image pixel location within the reference frame, and includes locus means for defining a first locus intersecting the target image pixel location, wherein the first selection means is arranged to select all image pixel locations which are intersected by the first locus.

The first locus is preferably a line extending through the reference frame. The line preferably extends through only one dimension of the reference frame and intersects all pixel locations within a column or a row of pixel locations within the reference frame.

The image generating means is preferably arranged to generate the time-domain image such that those image pixels of the time-domain image which are represented by image data items selected from a common image data set are arranged in a line containing only those pixels.

The image generating means is preferably arranged to generate the time-domain image comprising a matrix of pixels arranged to define columns and rows, wherein each column (or, alternatively, each row) contains only those image pixels sharing a common pixel location within the reference frame, and each row (or, alternatively, each column) contains only those image pixels selected from a common image data set.

Preferably the second selection means is arranged to select from a target one of the plurality of separate image data sets those image data items which represent image pixels located in a common first plane containing the first locus; wherein the image generating means is arranged to generate a first spatial-domain image according to the data items so selected. Preferably the image generating means is further arranged to generate a composite image containing the first spatial-domain image and the time-domain image aligned such that those pixels of the first spatial-domain image and of the time-domain image which share a common image pixel location within the reference frame are arranged in-line.

The locus means is preferably arranged to define a second locus which intersects the first locus at the target image pixel location and is preferably substantially coplanar with the first locus. The second selection means is preferably arranged to select all image data items the pixel locations of which are intersected by the second locus. The image generation means is preferably arranged to generate a second time-domain image in respect of image data items so selected. Preferably the image generating means is further arranged to generate a composite image which contains a second time-domain image in which the first spatial-domain image and the second time-domain image are aligned such that those pixels of the first spatial-domain image and of the second time-domain image which share a common image pixel location within the reference frame are arranged in-line.

The locus means is preferably arranged to define the first locus as a line and the second locus is a line substantially perpendicular to the first locus.

The locus means is preferably arranged to define a third locus which intersects the first locus and the second locus at the target image pixel location and is contained within one of the second plane and the third planes. The second selection means is preferably arranged to select all image data items the pixel locations of which are intersected by the third locus. The image generation means is preferably arranged to generate a third time-domain image according to image data items so selected. Preferably the image generating means is further arranged to generate a composite image which contains the third time-domain image, wherein the third time-domain image and one of the second and the third spatial-domain images respectively are aligned such that those pixels of the third time-domain image and those pixels of the one of the second and the third spatial-domain images which share a common image pixel location within the reference frame are arranged in-line.

The second selection means is preferably arranged to select from the target one of the plurality of separate image data sets those data items which represent image pixels located in a common second plane being non-parallel and non-coplanar with the first plane and containing the first locus; the image generating means is preferably arranged to generate a second spatial-domain image according to the data items so selected. Preferably the image generating means is also arranged to generate the composite image so as to contain the second spatial-domain image aligned such that those pixels of the second spatial-domain image and of the time-domain image which share a common pixel location within the reference frame are arranged in-line.

The second selection means is preferably arranged to select from the target one of the plurality of separate image data sets those data items which represent image pixels located in a common third plane being non-parallel and non-coplanar with the first plane (and preferably the second plane) and containing the second locus; and the image generating means is preferably arranged to generate a third spatial domain image according to the data items so selected. Preferably the image generating means is also arranged to generate the composite image so as to contain the third spatial-domain image aligned such that those pixels of the third spatial-domain image and of the second time-domain image which share a common pixel location within the reference frame are arranged in-line.

The image generating means is preferably operable to generate a composite image in which the spatial axis of the third time-domain image may be arranged parallel and in-line with the spatial axis of the first time-domain image (i.e. the two images side-by-side) when the third time-domain image is aligned with the third spatial-domain image. Alternatively, the spatial axis of the third time-domain image may be arranged parallel and in-line with the spatial axis of the second time-domain image (i.e. the two images side-by-side) when the third time-domain image is aligned with the second spatial-domain image. Preferably, the locus means is operable to define a third locus image of the form of the first or second locus image and to simultaneously present the third locus image in either or each of the second or third spatial-domain image and the third time-domain image.

The second selection means is preferably arranged to select the first, second and third planes to be mutually substantially perpendicular.

A plurality of items are "in-line" if they are all arranged in/along a common single straight line.

The invention may also comprise computer means programmed to perform the method according to the invention is its second aspect including some, none or all of the preferred features or variants discussed above. In a third of its aspects, the present invention may provide computer means programmed to perform the method according to the invention in its first aspect, including none or all of the preferred features or variants discussed above.

In a fourth of its aspects, the present invention may provide a computer program product containing a computer program for performing the method according to the invention in its first aspect, including none or all of the preferred features or variants discussed above.

The present invention may also provide a computer program containing computer code which, when implemented, performs the method according to the invention in its first aspect, including none or all of the preferred features or variants discussed above.

The present invention may also provide an image generated according to the invention in its first aspect, including none or all of the preferred features or variants discussed above.

The invention shall now/be described in terms of the following non-limiting examples with reference to the accompanying drawings in which.

Figure 6:
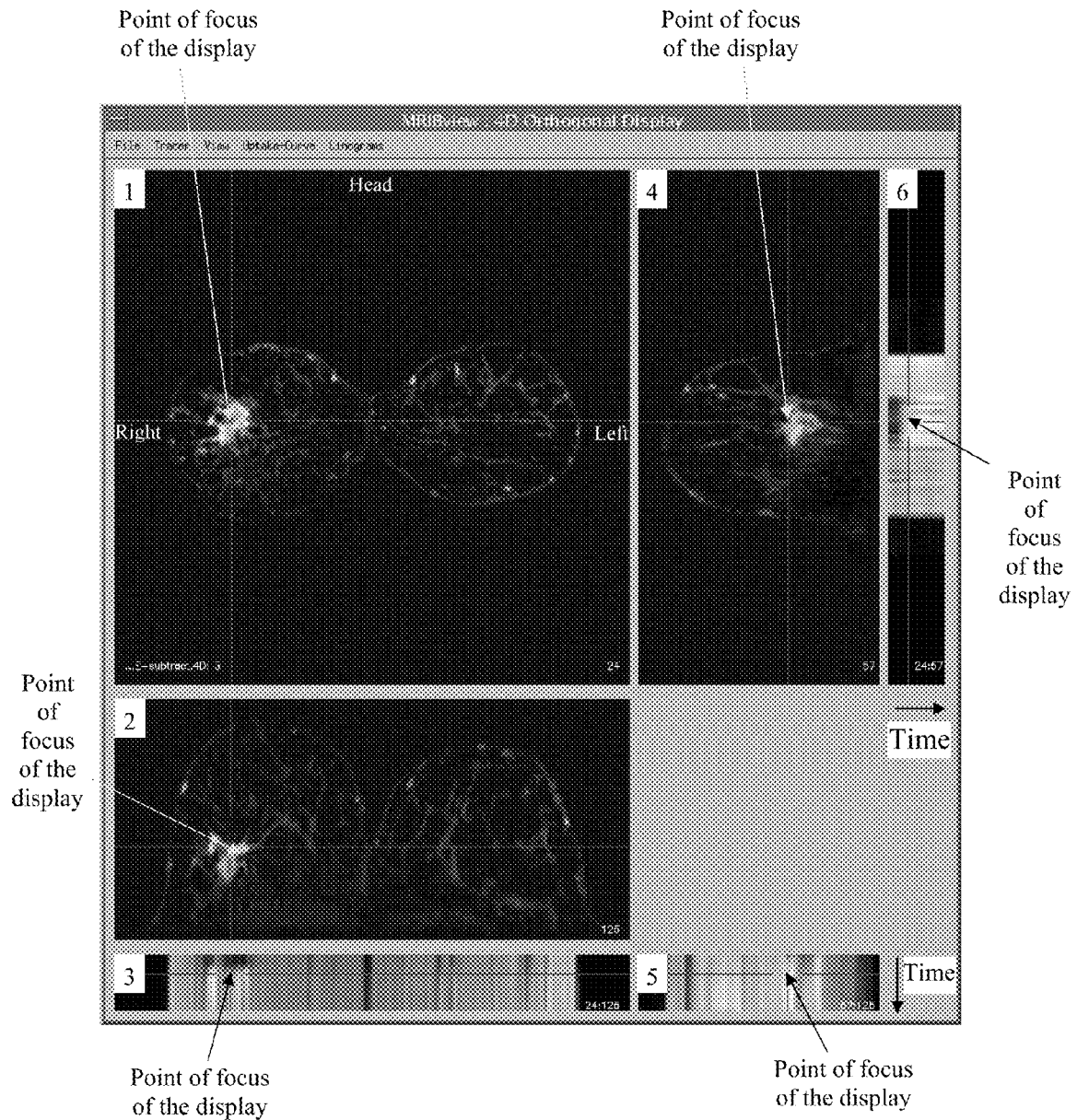
Figure 7:
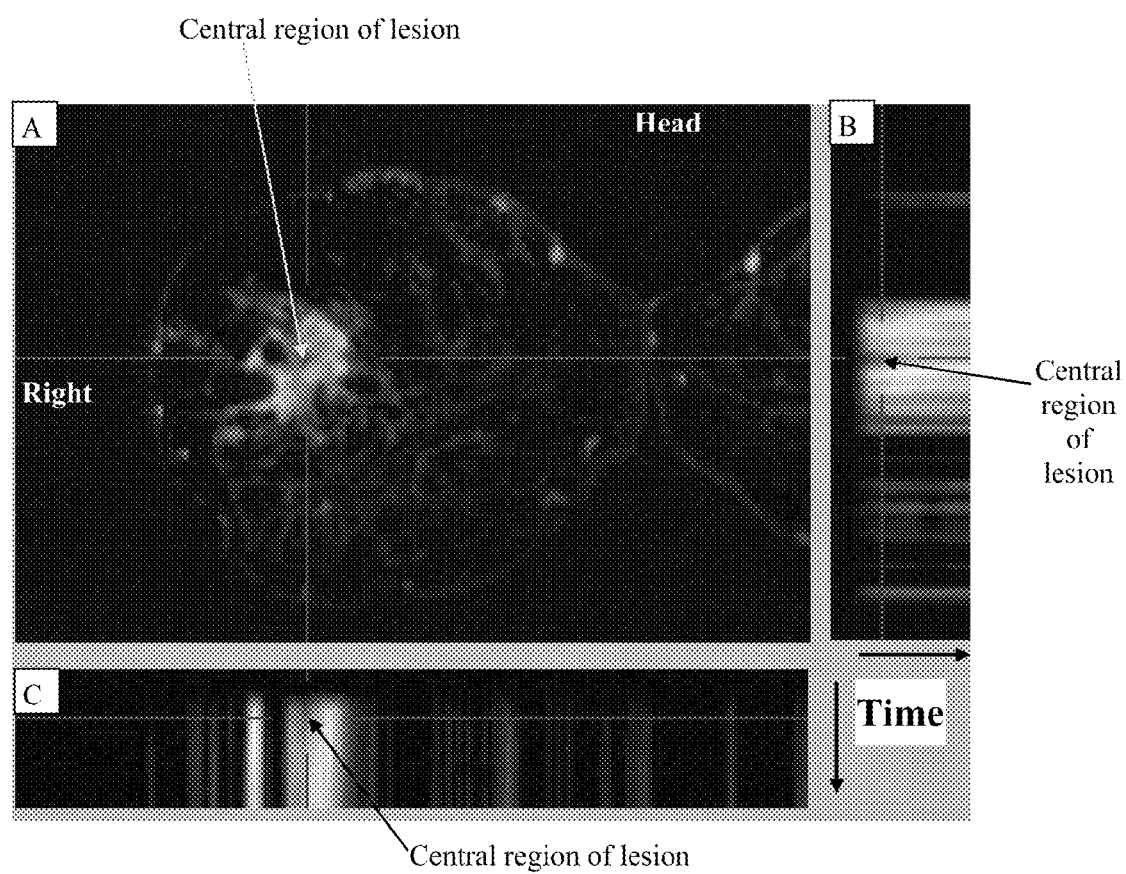

FIG. 6 presents a general view of a 4D orthogonal display tool;

FIG. 7 illustrates a composite image comprising two time-domain linogram images and a single spatial-domain image associated therewith.

Figure 4:
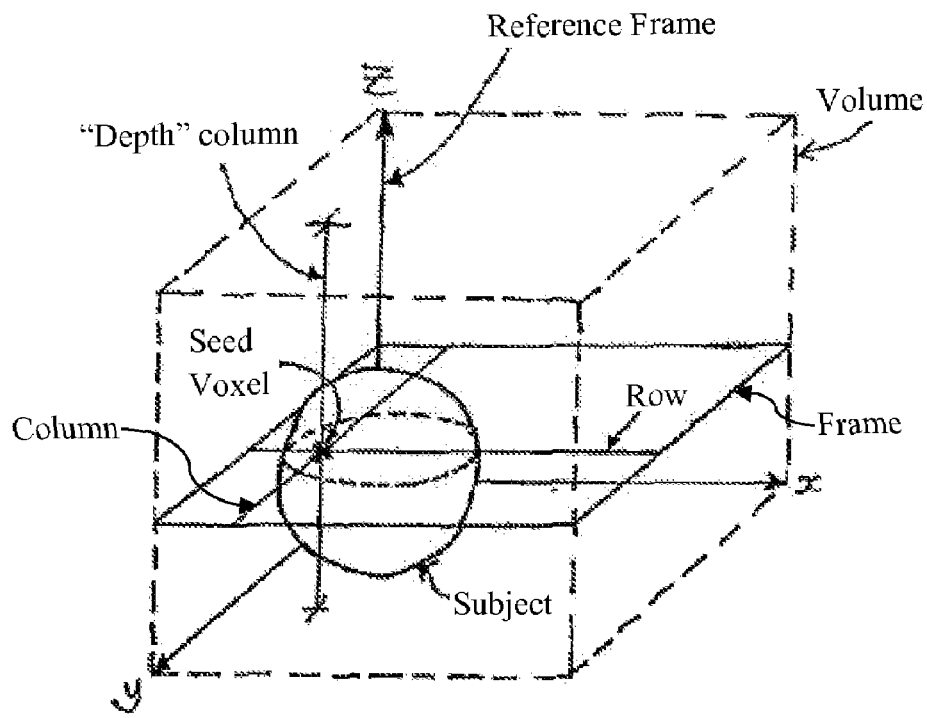
FIG. 4 illustrates schematically a reference frame within which a subject is located and according to which the image data items of the imaged subject represent the locations of image voxels representing points within the space defined by the reference frame.

Referring to FIG. 4 there is illustrated a reference frame R comprising three orthogonal axes (x, y, z) defining a spatially fixed coordinate system within which is located a subject O in respect of which image data items fully representing the object in 3D have been acquired. The acquired 3D image data items each represent the location of an image voxel of the image subject O according to the spatially fixed reference frame R within which the subject is located. A data set comprising a plurality of such image data items accordingly represents a plurality of locations within the reference frame R spanning a predefined volume of space V. A given such data set is acquired over a predetermined brief period of time sufficient to acquire all of the image data items comprising the set. Acquisition of such image data sets may be repeated a predetermined number of times (e.g. M times) thereby defining a time-sequence of separate image data sets each representing the same fixed volume V at the same fixed image voxel locations within the reference frame R.

Given such a time-sequence or series of M dynamic data sets (volumes), each imaged volume defined by a given data set within the sequence is represented as a stack of frames with each frame comprised of a 2D lattice of image voxels. The resulting image volume comprises a lattice of image voxels having dimensions $N_x \times N_y \times N_z$, (respectively number of columns and rows in a frame, and a stack length).

The method includes the initial step of selecting a plurality of separate image voxel locations within the reference frame (R) by: selecting a target voxel from the volume lattice V (hereinafter referred to as the "seed voxel"); selecting from the volume V a frame (P) containing the seed voxel; and, from the selected frame selecting the row (L) containing the seed voxel. The selected row represents a predetermined linear locus with which to select image voxel locations (once the seed voxel is identified). The locus need not be linear.

By selecting from each of the M separate image data sets those image data items which represent image voxels located at the plurality of selected image voxel locations defined by the locus L, one obtains image data items for use in generating a time-domain image. This data selection step may occur subsequent to selection of the image voxels locations via locus L, or may occur in tandem by, for example, after selecting a seed voxel, subsequently selecting from each of the M data sets the image data items contained in the selected frame (P), and then selecting image data items intersected by the locus L within each selected frame of data.

The process of selecting voxel locations may be undertaken with a computer and visual display unit implementing software according to the invention enabling a seed voxel (S), a frame (P) and a row or other locus (L) to be selected interactively from a visual display of an image or images of the object derived from one, some or all of the M image data sets.

Subsequent to data selection, a time-domain image is generated from the selected image data items wherein those image voxels of the time-domain image sharing a common image voxel location within the reference frame are arranged according to the time-sequence in a line containing only those voxels.

This may be done by combining the selected rows (R) into an image where order of rows follows the order of acquisition of the M data sets (volumes) from which the rows of data were selected. The resulting time-domain image has dimensions $N_x \times M$.

Any point on the time-domain image corresponds to a point in the reference frame R as represented by an image data set representing the volume V. Given the coordinates of the seed voxel S are $(x_s, y_s, z_s)$, the points $P_{TD}(u,v)$ within the volume V which are represented by the time-domain image corresponds to the four-dimensional points in the original data:.

$$P_{4D}(x,y,z,t) = P_{4D}(u, y_s, z_s, v) \quad (1)$$

Where x,y,z are volume lattice coordinates in the reference frame R, and the fourth coordinate, t, is a temporal coordinate, i.e. index of the dynamic volume within the time-sequence.

Using the same principle, one may create a time-domain image selecting columns L2 passing through the seed voxel S instead of the rows L. That is to say, the locus according to which image voxel locations are selected may be a column L2 rather than (or in addition to) a row L. In such a case the points of interest represented by the time-domain image will be defined by:

$$P_{4D}(x,y,z,t) = P_{4D}(x_s, v, z_s, u) \quad (2)$$

Furthermore, one may create a time-domain image selecting a "depth" column L3 passing through the seed voxel S perpendicular to the row L and column L2. That is to say, the locus according to which image voxel locations are selected may be a column L3 rather (or in addition to) than a row L, or column L2. In such a case the points of interest represented by the time-domain image will be defined by:

$$P_{4D}(x,y,z,t) = P_{4D}(x_s, y_s, u, v) \quad (3)$$

This equation assumes that pixels selected from a common data set are in rows. The choice of image plane from which this third locus L3 is selected may be the plane parallel to the plane containing the z axis and the x axis of the reference frame R, or may be the plane perpendicular to that and containing the z axis and the y axis of the reference frame.

Figure 5:
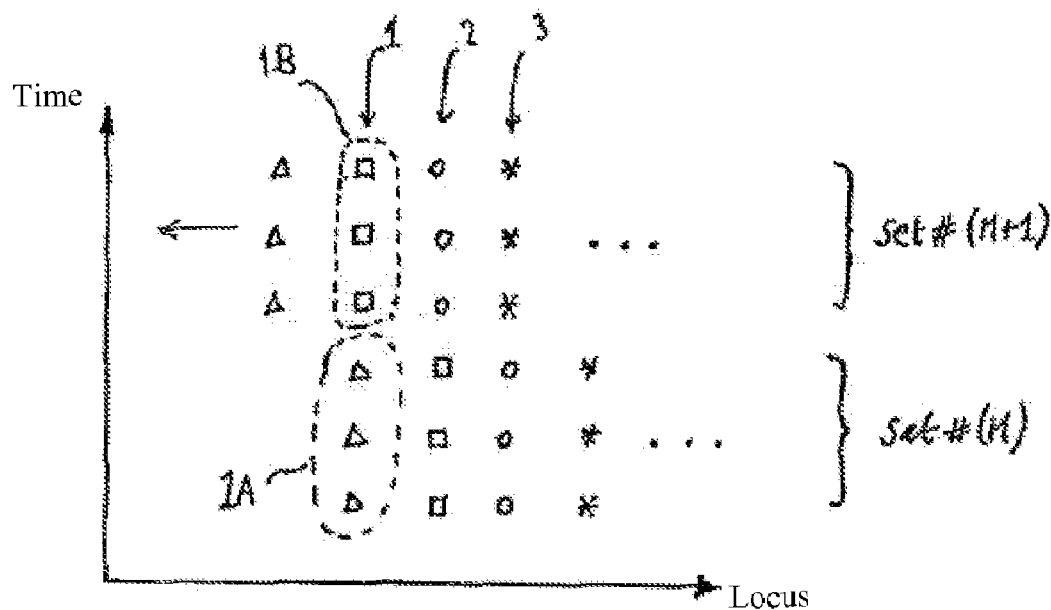
FIG. 5 illustrates schematically a motion artefact within a time-domain image generated according to a predefined locus L.

FIG. 5 schematically illustrates a motion artefact within a time-domain image generated according to a predefined locus L. The time-domain image comprises a plurality of separate vertical lines 1, 2 and 3 etc. (image columns) each containing only those voxels sharing a common image voxel location. The plurality of such separate vertical lines are arranged side-by-side such that those image voxels sharing a common image data set aligned so as to form a horizontal line (image rows). This arrangement assists in visually assessing image data for the presence of motion artefacts since such artefacts are most likely to affect a plurality of image voxel locations within the reference frame rather than just one such location. Accordingly, local image features may well display motion artefacts as a collective discontinuity or irregularity shared by several or each of the side-by-side vertical lines 1, 2, 3 etc. (image columns) within the time-domain image.

The time-domain image of FIG. 5 is generated such that those image voxels of the time-domain image which are represented by image data items selected from a common image data set (e.g. set number m or set number m+1 within the time-sequence of M sets) are arranged in image rows containing only those voxels. Consequently, the time-domain image comprises a matrix of voxels arranged to define columns and rows, wherein each column contains only those image voxels sharing a common voxel location within the reference frame R, and each row contains only those image voxels selected from a common image data set (e.g. set number m).

In order to facilitate easy visual identification of localised subject motion, the plurality of separate image voxel locations selected from within the reference frame R are neighbouring such locations. Consequently, provided that localised motion affects a small region of spatial dimensions matching or exceeding the spatial separation between such neighbouring image voxel locations, then motion artefacts will appear in the time-domain image as a collective discontinuity/irregularity affecting the same regions of neighbouring image columns 1, 2 and 3 etc. Such collective discontinuity not only indicates the extent of subject motion but is also easier to spot within a time-domain image. Each separate image column 1, 2, 3 etc. of voxels contains successive column segments (e.g. segment 1A and segment 1B of column 1) containing only those voxels which share a common image data set. Each such line segment is comprised only of 3 copies of the same image voxel (any number of copies could be used in practice). Motion artefacts in a single image voxel location result in a visible shift of an entire line segment. This is much easier to identify than is a shift in a single voxel. Thus, while segment 1A of image column 1, derived from the data set number m displays an image feature represented by triangles in FIG. 5, segment 1b of image column 1, derived from the data set number m+1 displays an image feature represented by circles. However, the segment of column 2 associated with set m also displays an image feature represented by circles. This indicates that, in between acquiring image data set m and set m+1, the object feature responsible for the image feature represented by circles has moved by an amount equal to the separation between the image voxel locations represented by columns 1 and 2 of the time-domain image. Thus, the visible discontinuity in columns 1 and 2 (and 3) of the time-domain image is a motion artefact and not a property of the object per se.

FIGS. 1(a) to 1(i) illustrate a series of time-domain images of a breast imaged according to the present invention with data acquired using MR. FIG. 1 shows 9 separate examples (FIGS. 1(a) to 1(i)) of horizontal time-domain images each for a time-sequence comprising seven separate breast measurements (i.e. M=7). The dynamic series is derived from seven image volumes: two pre- and five post-contrast, i.e. image data acquisition performed before (twice) and after (5 times) administration of the contrast agent Gd-DTPA. The time interval between acquisition of successive data sets was 90 sec. The data sets were acquired using 3D T1-weighted fast spoiled gradient echo sequence. For better visual representation the columns of the time-domain images generated with column segments each containing two identical image voxels (see FIG. 5 and the discussion thereof).

Looking at the examples, one can easily conclude that cases (a-c) show no motion, in cases (d-g) motion is obvious, and cases (h, i) present local motion (circled on the images).

The time-domain imaging approach may be used for 4-Dimensional visualisation of contrast enhancement of a subject containing a contrast agent. This application of the time-domain image preferably employs "subtracted" images in which the voxel value of each "subtracted" image data item represents the difference in voxel intensity (i.e. the contrast) as between the same voxel position in two different images, the first image being of the subject containing no contract agent and the second image being of the subject after administration of a contrast agent. In this case a time-domain image created for a seed voxel S selected inside a lesion on one a subtracted image will show the temporal pattern of contrast enhancement.

Figure 1:
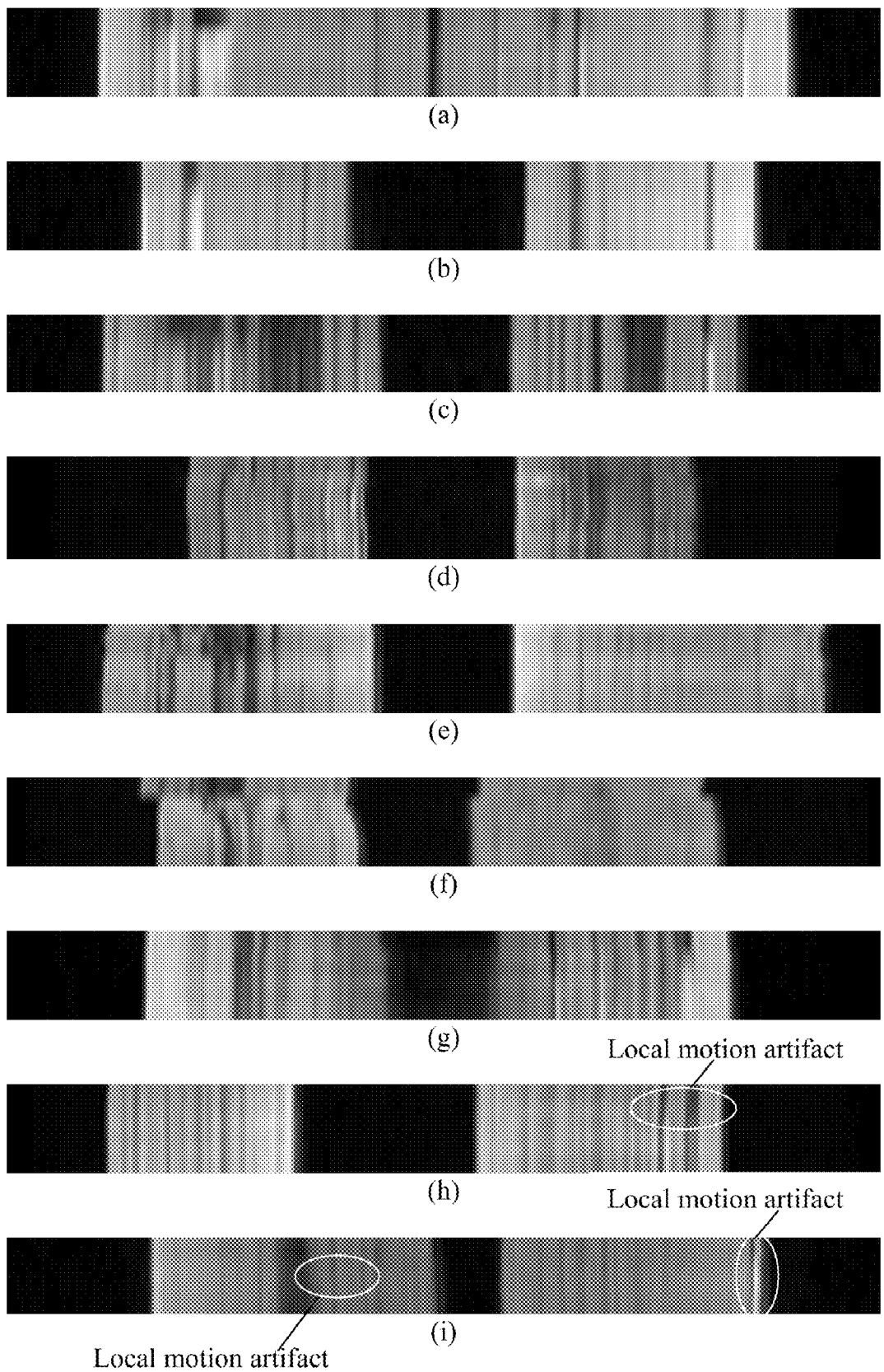
FIG. 1 illustrates a plurality (a) to (i) of time-domain images displaying various degrees of image discontinuity/irregularity due to subject motion (i.e. motion artefacts)
Figure 2:
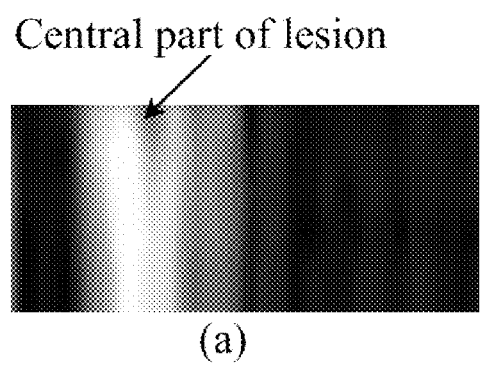
FIG. 2 illustrates two time-domain images (a) and (b) displaying the temporal development of contrast agent uptake within an imaged subject at selected regions thereof.
Figure 2:
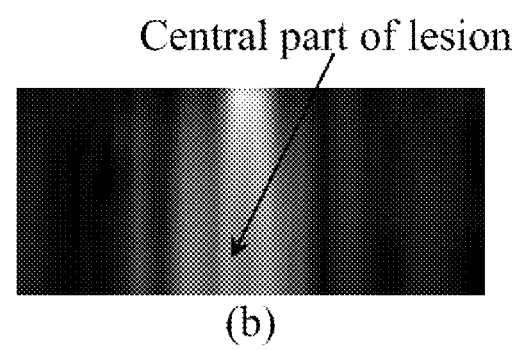

FIG. 2 shows fragments of horizontal time-domain MR breast images. The images display two lesions (FIG. 2(a) and FIG. 2(b) with different patterns of voxel enhancement. In both case the seed voxel (S) was selected near the centre of a lesion. The time axis is oriented from top to the bottom of the images. This means that the top row of each image was selected from the first post-contrast image data set, the next one from the second, and so on. One can see in the FIG. 2(a) that the central part of the lesion is not enhanced on the first image (top line of FIG. 2(a)—indicated by arrow), but becomes enhanced at the bottom of the image (i.e. at a later time within the time-sequence). At the same time, the peripheral region on the lesion is enhanced at the top of the image of FIG. 2(a). The FIG. 2(b) presents opposite behaviour when maximum of the lesion central region enhancement is at the top, and maximum of the periphery enhancement is at the bottom, when the contrast is already washed out from the centre (pointed to by an arrow in FIG. 2(b).

Time-domain images may be generated which represent the time-development of image voxels intersected by perpendicular linear locus' lying within the same selected frame/plane (P). For example the time-domain image derived from the row locus (L) may represent the horizontal dimension of the volume V, while the image derived from the column locus (L2) represents the vertical dimension. A third complimentary time-domain image may be created using similar approach according to a third locus L3 extending through the seed voxel S in a direction orthogonal to the frame/plane (P), and would represent the depth dimension.

Equations 1, 2 and 3 imply a way of 4D navigation of a dynamic series of images. A 4-Dimensional orthogonal display and an interactive display tool for 4-D visualisation, navigation and alignment quality control of the time-sequence of 3D image data sets is provided according to the present invention. The tool uses the orthogonal display to select a point of interest—the seed voxel/voxel—using one of the M image data sets volumes at a time. Once a seed voxel S is chosen, horizontal, vertical and depth time-domain images are created and displayed as discussed above. The selection of a new point of interest (i.e. a new seed S) on any one of the time-domain images results in the reselection, from the time-series of image data sets, of the appropriate image data set to be used for a concurrent display of the image plane (P) containing the reselected seed voxel, along with a consistent change in the spatial point of focus (i.e. the seed) within the image.

Figure 3:
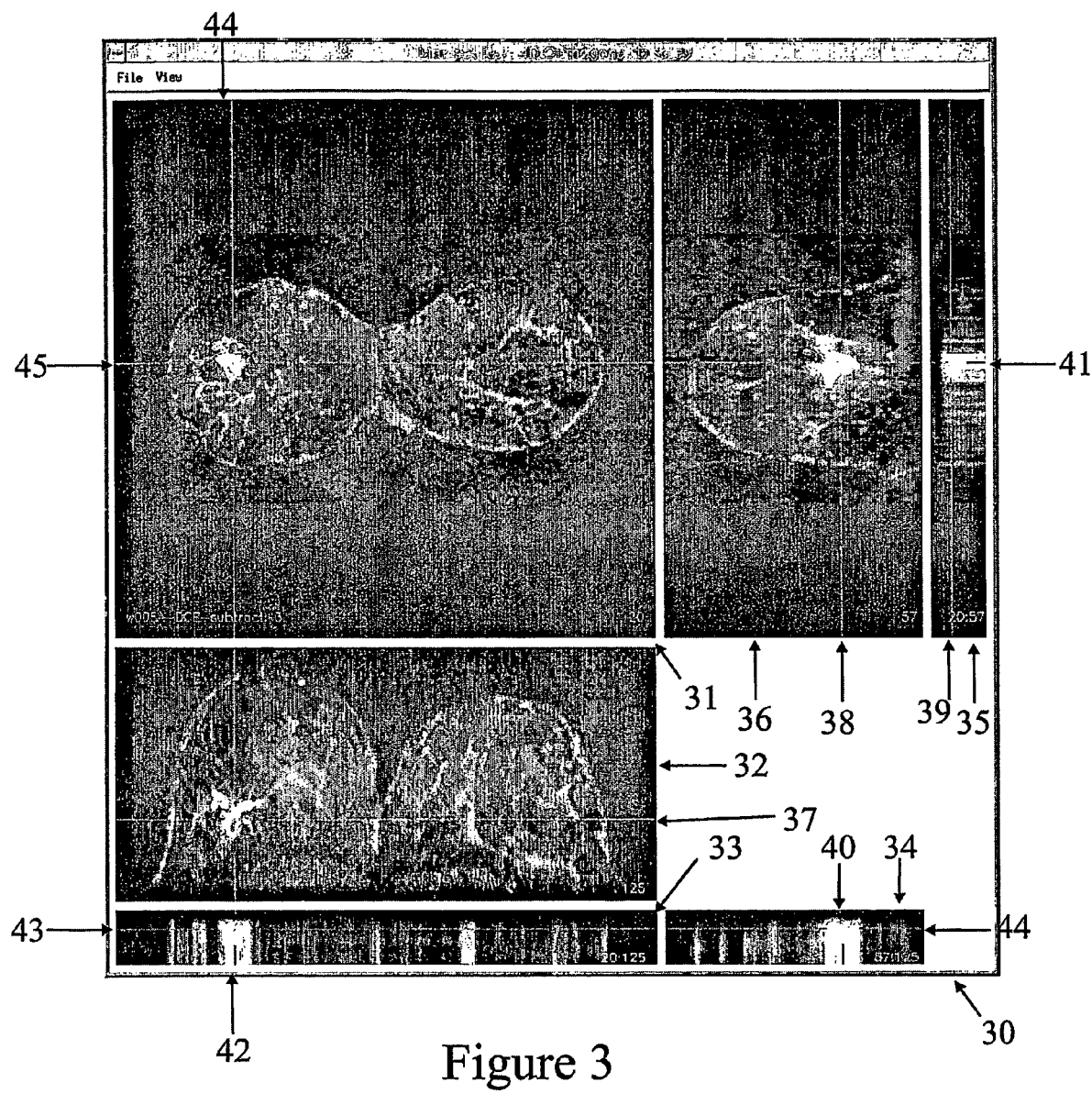
FIG. 3 illustrates a composite image comprising three time-domain images and three spatial-domain images defined by three perpendicular locus'.

FIG. 3 illustrates a composite interactive image display 30 comprising a first spatial-domain image 31 generated from image data items selected from a single image data set (e.g. set number m) which represent image voxels located in a common first plane (P) containing a first locus 45. The interactive display generates a composite image containing the first spatial-domain image 31 and a horizontal time-domain image 33 aligned such that those voxels of the first spatial-domain image and of the time-domain 33 image which share a common image voxel location within the reference frame are arranged in-line.

The first locus is simultaneously visually presented within the composite image as a first locus image overlaying each of the spatial-domain 31 (item 45) and the time-domain 33 images (item 43) and intersecting those image voxels of the respective images which intersect the first locus in the reference frame.

The composite image contains a vertical time-domain image 35 in respect of a second locus 44 which intersects the first locus 45 at the seed voxel, and is substantially coplanar with the first locus. The first spatial-domain image 31 and the second time-domain image 35 are aligned such that those voxels of the first spatial-domain image and of the second time-domain image which share a common image voxel location within the reference frame are arranged in-line. A second locus image (44, 39) of the form of the first locus image is simultaneously presented in each of the spatial-domain image 31 and the second time-domain image 35.

The first locus is an image row within the first spatial-domain image 31 and the second locus is an image column perpendicular to the first predefined locus. This provides a cross-hair effect in a locus image comprising the first and second locus images. The cross-hairs centre upon the seed voxel location within the first spatial-domain image 31.

The composite image 30 further includes a second 32 and a third 36 spatial-domain image each separately generated from image data items selected from the same image data set employed for the first spatial-domain image. The image data items employed in generating the second spatial-domain image represent image voxels located in a common second plane which contains the first locus 45 (see item 37 of image 32). The image data items employed in generating the third spatial-domain image represent image voxels located in a common third plane which contains the second locus (see items 38 and 36). Each of the second and third planes is non-parallel and non-coplanar with the first plane P and with each other.

The composite image contains the second spatial-domain image 32 and the third spatial-domain image 36 each aligned such that those voxels of the first spatial-domain image, the second spatial-domain image and the first time-domain image which share a common voxel location in the reference frame are arranged in-line. Similarly, those voxels of the first spatial-domain image, the third spatial-domain image and the second time-domain image which share a common voxel location within the reference frame are arranged in-line. Consequently, a third spatial domain (i.e. depth) is represented within the composite image by the presence of the second and/or third spatial-domain images. The second spatial-domain image shares one common spatial dimension (i.e. the horizontal dimension) with both the first spatial-domain image 31 and the first time-domain image 33. Similarly, the third spatial-domain image shares one common spatial dimension (i.e. the vertical dimension) with both the first spatial-domain image 31 and the second time-domain image 35. A third time-domain image 34 is provided within the composite image 30 aligned to the horizontal axis of the third spatial-domain image 36.

Each image within the composite image contains a locus image (items 37, 38, 39, 40, 41, 42, 43, 44, 45) representing those voxels within the image which are intersected by a locus.

FIG. 3 presents the general view of a 4-Dimensional orthogonal display according to the present invention. The display shows three planes in orthogonal reformat of a coronal stack of subtracted post-contrast breast images. A vertical time-domain image 35 is displayed next to the sagittal frame 36, and a horizontal time-domain image 33—below the axial frame 32. The "depth" time-domain image 34 is displayed at the bottom right corner of the composite image 30, and has a horizontal axis, and locus image 40, aligned with that of the sagittal frame 36 and locus image 38. Similarly, the vertical axis of the "depth" time-domaim image 34 is aligned with that of the horizontal time domain image 33.

The relative positions of the separate images within the composite image 30 are selected in such a way that aligned axes coincide in the 4D space. The image on display in FIG. 3 is derived from an image data set representing the first post-contrast image of the subject. The display is focused on the central region of the lesion. The time-domain images show a focal pattern of enhancement (i.e. central part of the lesion that is not enhanced on the first post-contrast image, but becomes enhanced later.)

A subtraction image is usually employed in dynamic imaging of breast tissues for localisation of a lesion, and visual analysis of lesion morphology. It follows that the quality of the subtraction image is essential for the correct interpretation of the image data.

The present invention is effective for patient motion detection which, if left undetected, could lead to poor or erroneous image diagnosis.

The present invention provides a method and apparatus for the assessment of the alignment of 3D imaged subject volumes and is suitable for detecting motion artefacts resulting from local areas of motion/deformations within the imaged volume as well as global motion. It is of particular importance for breast imaging because of the high elasticity of breast tissue which renders it susceptible to localised (non-global) movements due to deformations.

Furthermore, the present invention also provides a method of visualisation of dynamic contrast enhancement in a subject. A time-domain image of subtracted post-contrast images (or other post-processed images) will show the enhancement pattern dynamics. This allows radiologist looking at one volume at a time to use additional information from all the range of dynamic volumes. The 4D orthogonal display provides the interface for effective 'navigation' in 4D dynamic data. The tool can be used for both motion detection and visualisation. The ability to review simultaneously the subtracted image and the time-domain image of the whole range of subtraction images focused on the lesion may provide additional power to the interpretation process.

A further illustrative example is discussed below with reference to FIG. 6 and FIG. 7. The proposed method is based on using auxiliary 2D images that will be referred to as temporal domain linograms. A temporal domain linogram (TDL) shows a time evolution of a free form line passing through the region of interest. This line will be further referred to as a spatial locus of the TDL. A sequence of voxels taken at the specific spatial locations defined by the locus is extracted from each one of the consecutively acquired volumes. The extracted loci are aligned following the order of acquisition, thus forming a 2D image having one temporal and one spatial axis. If the volumes are properly aligned, the extracted loci will correspond to the same spatial locations relative to the patient, and therefore should be correlated. Thus the TDL will display a pattern of bars parallel to the temporal axis. (Those bars are traces of anatomical details.) Disturbances of this pattern will indicate spatial misalignment of the volumes. For example, if the locus intercepts a blood vessel, trace of the blood vessel on the TDL will be disturbed by motion having a component orthogonal to its spatial axis. The region of misalignment detected on the TDL can be located by projecting it back into the original image data.

The creation and use of a temporal domain linogram (TDL) preferably follows a procedure in which the imaged volume is defined by a spatial frame of reference, R, with axes L (left), P (posterior), H (cranial). The spatial locus, S, is a free form line passing through the region of interest (ROI). A sequence of voxels taken at the spatial locations defined by the locus is extracted from each one of the consecutively acquired volumes. The extracted loci are aligned following the order of acquisition of the volumes. If there are no misalignments at the locations defined by the locus, the image will present a pattern of lines parallel to the temporal axis. Local disturbances of the above described pattern indicate motion (i.e. misalignment of the volumes).

FIG. 6 presents the general view of the proposed 4D orthogonal display. The display shows a three plane orthogonal reformat of one of the subtracted post-contrast volumes of a breast dynamic image along with three TDLs. The TDLs are created using three loci of the form of straight line, intercepting in the point of focus of the orthogonal display. The loci are mutually orthogonal, and each one is parallel to one of the main spatial axes of the volume. The TDLs are displayed in the way that their loci are aligned with the corresponding spatial axes of the displayed reformatted images. The interface is similar to one of a 3D orthogonal display. A point of interest may be chosen on any of the reformatted images or TDLs. By choosing the point of interest on a TDL, one actually chooses a temporal point (i.e. a specific volume in the sequence) and a spatial point on the locus of the TDL. As a result, the 3D volume used for display will be consistently altered along with changing the spatial point of focus. In this way the display expands on the classic 3D orthogonal display by adding the fourth, temporal, dimension.

Using the 4D orthogonal display one can navigate to the region of the lesion and check this local region for motion observing the TDLS. The display also allows tracing the misalignment detected on a TDL back to the original volume data. By varying the selected planes from the 3D volume, any region within the imaging field can be interrogated.

If no motion was detected at the region of interest, the TDL can be also used for 4D visualization of the pattern of contrast enhancement. This becomes possible if one creates a subtracted TDL, i.e. the TDL where the locus extracted from the pre-contrast dataset is subtracted from the loci extracted from the post-contrast datasets.

FIG. 6 presents a general view of 4D orthogonal display tool. The display contains three-plan orthogonal reformat of a subtracted breast volume, and three TDLs. The original volume has coronal plane orientation. The loci of TDLs are mutually orthogonal straight lines. Each locus is parallel to one of the main axes of the volume. The reformat images and the loci share one common point in space and time—point of focus of the display (shown by the arrow in all the views). Spatial axes of TDLs are aligned on display with the corresponded axes of the reformatted images: The Left/Right (LR) TDL (3) is aligned with LR axes of the coronal (1) and the axial (2) views; Anterior/Posterior (AP) TDL (5)—with AP axis of the sagittal view (4); and Cranial/Caudal TDL (6)—with the Cranial/Caudal axes of the coronal and sagittal views.

The temporal domain linogram method was applied to 81 dynamic studies of women at high risk of breast cancer. Informed consent of the patients was requested for use of anonymised images for research purposes. Each study consists of two pre-contrast and at least four post-contrast datasets acquired after administration of Gd-DTPA using a 3D T1-weighted fast spoiled gradient echo sequence. Temporal resolution was 90 sec. in most cases. It was found that 16 cases have no motion, 34 have prominent motion, and local motion was found in 31 cases. Three examples are presented herein.

FIG. 7 shows a measurement that was assessed for motion, and in which no motion was found. The shown image is a subtracted post-contrast image acquired at 90 sec. after administration of Gd-DTPA using a Siemens 1.5T Vision scanner. The image shows a lesion in the right breast. The lesion was histologically identified as malignant (invasive mixed lobular and no specific type (NST) carcinoma, grade II). The presented subtracted TDLs demonstrate a centripetal pattern of enhancement (i.e. the central region of the lesion enhances later than the periphery) characterizing malignant lesion.

FIG. 7 presents subtracted temporal domain linograms, with no detected motion. The subtracted image (A) shows a lesion in the right breast. The central region of the lesion (shown by the arrow) is enhanced to smaller extent than the periphery. Subtracted TDLs (B, C) show that the central region becomes enhanced at the late post-contrast time, when the contrast material partly washed out of the peripheral regions. The TDLs' loci are straight lines intercepting in the central region of the lesion. To improve visual representation all the presented TDLs are zoomed by a factor 4 in the time domain using linear interpolation. This representation may yield the optimal visual perception. Although nearest neighbour interpolation seems to accentuate misalignment details, linear interpolation smoothes differences in the intensities between volumes that helps to concentrate the attention on misalignments.

Subtraction images are often employed in dynamic imaging of breast for suppression of fatty tissue, to localize lesions, and to aid in visual analysis of lesion morphology. Prominent motion can readily be identified by observing the subtraction image. However, local motion of the breast may produce an artifact that can mislead the observer. Applying the proposed approach routinely for assessment of findings, one can distinguish between a motion artifact and a lesion. The method enables a fast, convenient and objective comparison of volumes, which is recommended for radiological practice as a mean of validating findings and detecting 'pseudo lesions'. A TDL is easy to interpret and can be saved with the patient data for reporting. The TDL can be used to assess motion of the whole volume and validate a need for motion correction where there is no obviously observable bulk motion. This can be done by examining multiple randomly selected local regions from the imaged volume.

Modifications and variants to the above embodiments, such as would be readily apparent to the skilled person, are encompassed within the scope of the present invention.

The invention claimed is:

1. A method of processing a time-sequence of separate image data sets each set comprising a plurality of image data items which each represent the location of an image pixel of the image subject according to a spatially fixed reference frame within which the subject is located, using a digital computing device to perform the steps of:
   (a) selecting a plurality of separate image pixel locations within said reference frame, comprising selecting a target image pixel location within said reference frame and subsequently selecting all image pixel locations which are intersected by a predefined first locus intersecting said target image pixel location;
   (b) selecting from each of a plurality of said separate image data sets those image data items which represent image pixels located at said plurality of separate image pixel locations;

(c) generating a time-domain image according to said selected image data items wherein those image pixels of the time-domain image sharing a common image pixel location within said reference frame are arranged in said time-sequence in a line containing only those pixels;

(d) selecting as a target one of said plurality of separate image data sets and selecting therefrom those image data items which represent image pixels located in a common first plane containing said first locus and generating a first spatial-domain image according to the data items so selected; and (e) generating a composite image containing said first spatial-domain image and said time-domain image aligned such that those pixels of the first spatial-domain image and of the time-domain image which share a common image pixel location within said reference frame are arranged in-line.

2. A method according to claim 1 wherein each image pixel is an image voxel such that each image data item represents the location of an image voxel of the image subject according to a spatially fixed three-dimensional reference frame wherein each image data set contains image data items representing image voxel locations spanning all three dimensions of said reference frame.

3. A method according to claim 1 wherein said predefined first locus is a line extending through said reference frame.

4. A method according to claim 3 wherein said line extends through only one dimension of said reference frame and intersects all pixel locations within a column or a row of pixel locations within the reference frame.

5. A method according to any of preceding claims 3 to 4 wherein said time-domain image is generated such that those image pixels of the time-domain image which are represented by image data items selected from a common image data set are arranged in a line containing only those pixels.

6. A method according to claim 5 in which said time-domain image comprises a matrix of pixels arranged to define columns and rows, wherein each column contains only those image pixels sharing a common pixel location within said reference frame, and each row contains only those image pixels selected from a common image data set or vice versa.

7. A method according to any one of preceeding claims 3-4 in which said composite image contains a second said time-domain image generated by selecting at step (a) said target image pixel location and image pixel locations which are intersected by a predefined second locus which intersects said first locus at said target image pixel location and is substantially coplanar with said first locus, wherein said first spatial-domain image and said second time-domain image are aligned such that those pixels of the first spatial-domain image and of the second time-domain image which share a common image pixel location within said reference frame are arranged in-line.

8. A method according to claim 7 wherein said first predefined locus is a line and said second predefined locus is a line substantially perpendicular to said first predefined locus.

9. A method according to any of preceding claims 3-4 including:

selecting from said selected target those data items which represent image pixels located in a common second plane being non-coplanar with said first plane and containing said first locus; generating a second spatial domain image according to the data items so selected; and, generating said composite image so as to contain said second spatial-domain image aligned such that those pixels of the second spatial-domain image and of said time-domain image which share a common pixel location within said reference frame are arranged in-line.

10. A method according to claim 7 including: selecting from said selected target those data items which represent image pixels located in a common third plane being non-coplanar with said first plane and containing said second locus; generating a third spatial domain image according to the data hems so selected; and, generating said composite image so as to contain said third spatial-domain image aligned such that those pixels of the third spatial-domain image and of said second time-domain image which share a common pixel location within said reference frame are arranged in-line.

11. A method according to claim 10 in which said composite image contains a third time-domain image generated by selecting at step (a) said target image pixel location and image pixel locations which are intersected by a predefined third locus which intersects said first locus and said second locus at said target image pixel location and is contained within one of said second plane and said third plane, wherein said third time-domain image and one of said second and said third spatial-domain images respectively are aligned such that those pixels of the third time-domain image and those pixels of said one of said second and said third spatial-domain images which share a common image pixel location within said reference frame are arranged in-line.

12. A method according to claim 10 wherein said first, second and third planes are all mutually substantially perpendicular.

13. Apparatus for processing a time-sequence of separate image data sets each set comprising a plurality of image data hems which each represent the location of an image pixel of the image subject according to a spatially fixed reference frame within which the subject is located, comprising:

(a) first selection means selecting a plurality of separate image pixel locations within said reference frame, wherein the first selection means is arranged to select a target image pixel location within said reference frame, and includes locus means for defining a first locus intersecting said target image pixel location, wherein the first selection means is arranged to select all image pixel locations which are intersected by said first locus;

(b) second selection means for selecting from each of a plurality of said separate image data sets those image data hems which represent image pixels located at said plurality of separate image pixel locations, wherein said second selection means is arranged to select from as a target one of said plurality of separate image data sets those image data hems which represent image pixels located in a common first plane containing said first locus;

(c) image generating means for generating a time-domain image according to said selected image data hems wherein those image pixels of the time-domain image sharing a common image pixel location within said reference frame are arranged in said time-sequence in a line containing only those pixels, wherein the image generating means is arranged to generate a first spatial-domain image according to the data hems so selected and, to generate a composite image containing said first spatial-domain image and said time-domain image aligned such that those pixels of the first spatial-domain image and of the time-domain image which share a common image pixel location within said reference frame are arranged in-line.

14. Apparatus according to claim 13 wherein each image pixel is an image voxel such that each image data hem represent the location of an image voxel of the image subject according to a spatially fixed three-dimensional reference frame wherein each image data set contains image data hems representing image voxel locations spanning all three dimensions of said reference frame.

15. Apparatus according to claim 13 wherein said pre-defined first locus is a line extending through said reference frame.

16. Apparatus according to claim 15 wherein said line extends through only one dimension of said reference frame and intersects all pixel locations within a column or a row of pixel locations within the reference frame.

17. Apparatus according to any of preceding claims 15 to 16 wherein said image generating means is arranged to generate said time-domain image such that those image pixels of the time-domain image which are represented by image data items selected from a common image data set are arranged in a line containing only those pixels.

18. Apparatus according to claim 17 in which said image generating means is arranged to generate said time-domain image comprising a matrix of pixels arranged to define columns and rows, wherein each column contains only those image pixels sharing a common pixel location within said reference frame, and each row contains only those image pixels selected from a common image data set, or vice versa.

19. Apparatus according to any of preceding claims 15 to 16 wherein: said locus means is arranged to define a second locus which intersects said first locus at said target image pixel location and is substantially coplanar with said first locus; said second selection means is arranged to select all image data items the pixel locations of which are intersected by said second locus; said image generation means is arranged to generate a second time-domain image according to image data items so selected and to generate a composite image which contains a second time-domain image in which said first spatial-domain image and said second time-domain image are aligned such that those pixels of the first spatial-domain image and of the second time-domain image which share a common image pixel location within said reference frame are arranged in-line.

20. Apparatus according to claim 19 wherein said Locus means is arranged to define said first locus as a line and said second locus is a line substantially perpendicular to said first locus.

21. Apparatus according to any of preceding claims 15 to 16 wherein: said second selection means is arranged to select from said selected target those data items which represent image pixels located in a common second plane being non-coplanar with said first plane and containing said first locus; said image generating means is arranged to generate a second spatial-domain image according to the data items so selected, and to generate said composite image so as to contain said second spatial-domain image aligned such that those pixels of the second spatial-domain image and of said time-domain image which share a common pixel location within said reference frame are arranged in-line.

22. Apparatus according to claim 19 wherein: said second selection means is arranged to select from said selected target those data items which represent image pixels located in a common third plane being non-coplanar with said first plane and containing said second locus; and said image generating means is arranged to generate a third spatial domain image according to the data items so selected, and to generate said composite image so as to contain said third spatial-domain image aligned such that those pixels of the third spatial-domain image and of said second time-domain image which share a common pixel location within said reference frame are arranged in-line.

23. Apparatus according to claim 22 wherein: said locus means is arranged to define a third locus which intersects said first locus and said second locus at said target image pixel location and is contained within one of said second plane and said third planes; said second selection means is arranged to select all image data items the pixel locations of which are intersected by said third locus; said image generation means is arranged to generate a third time-domain image according to image data items so selected and to generate a composite image which contains said third time-domain image, wherein said third time-domain image and one of said second and said third spatial-domain images respectively are aligned such that those pixels of the third time-domain image and those pixels of said one of said second and said third spatial-domain images which share a common image pixel location within said reference frame are arranged in-line.

24. Apparatus according to claim 22 wherein said second selection means is arranged to select said first, second and third planes to be mutually substantially perpendicular.

25. A computer program product, comprising a computer usable medium having a computer readable program code embodied therein, said computer readable program code adapted to be executed to implement the method according to claim 1.

* * * * *